United States Patent [19]

Kawabata

[11] Patent Number: 5,044,661
[45] Date of Patent: Sep. 3, 1991

[54] ACTIVE SUSPENSION SYSTEM WITH ENHANCED SUSPENSION CONTROL CHARACTERISTICS AT ON/OFF TRANSISTION OF SUSPENSION CONTROL

[75] Inventor: Kazunobu Kawabata, Kanagawa, Japan

[73] Assignee: Nissan Motor Company, Limited, Japan

[21] Appl. No.: 574,720

[22] Filed: Aug. 30, 1990

[30] Foreign Application Priority Data

Aug. 31, 1989 [JP] Japan .................................. 1-225581

[51] Int. Cl.⁵ .............................................. B60G 17/08
[52] U.S. Cl. .................................... 280/707; 364/424.1
[58] Field of Search ............................... 280/707, 709; 364/424.1, 424, 426

[56] References Cited

U.S. PATENT DOCUMENTS

4,702,490 10/1987 Yamaguchi et al. ................. 280/707
4,919,440 4/1990 Tsukamoto .......................... 280/707

Primary Examiner—Kenneth R. Rice
Attorney, Agent, or Firm—Lowe, Price, LeBlanc & Becker

[57] ABSTRACT

An active suspension system includes a pressure holding mechanism with a pressure holding valve means which is maintained in conductive state for a given period in which the fluid pressure in a working chamber is gradually adjusted toward a predetermined neutral pressure level after turning OFF of a power switch. The pressure holding valve is, on the other hand, maintained in non-conductive state for a given period until the fluid pressure is adjusted to the neutral pressure after turning ON of the power switch. A control means is provided for performing suspension control operation in response to various suspension control parameters for adjusting fluid pressure in a working chamber of a cylinder for regulating vehicular height and vehicular attitude. The control means being responsive to switching of the pressure holding valve from non-conductive state to conductive state for permitting pressure supply therethrough for maintaining a suspension control command value at a predetermined value essentially corresponding to a neutral pressure for a predetermined transition period so as to assure moderate increase of the fluid pressure.

15 Claims, 4 Drawing Sheets

ACTIVE SUSPENSION SYSTEM WITH ENHANCED SUSPENSION CONTROL CHARACTERISTICS AT ON/OFF TRANSISTION OF SUSPENSION CONTROL

BACKGROUND OF THE INVENTION

1. Field of the Invention

The present invention relates generally to an active suspension system for an automotive vehicle. More specifically, the invention relates to an active suspension system with a suspension control system which can provides enhanced control characteristics at ON/OFF transition period of a power supply for assuring riding comfort upon re-starting of power supply by preventing abrupt change of line pressure.

2. Description of the Background Art

Japanese Patent First (unexamined) Publication (Tokkai) Heisei 1-122717 discloses one of typical construction of an active suspension system. The shown system includes a hydraulic cylinder disposed between a vehicular body and a vehicular wheel. A fluid pressure in the working chamber of the hydraulic cylinder is externally controlled by a hydraulic pressure circuit and a pressure control valve disposed in the pressure circuit. The shown system further has a power holding system for maintaining power supply for a given period after turning of a main switch of power source circuit. During the given period, the fluid pressure in the working chamber is gradually adjusted toward a predetermined neutral pressure. The system is further provided with a pressure holding mechanism for maintaining the fluid pressure in the working chamber at the neutral pressure while the power is not supplied to the control system. Namely, in the shown system, pressure control can be maintained in the given period for adjusting the fluid pressure in the working chamber at the neutral pressure. The control system is thereafter shut down with maintaining the pressure holding mechanism at the pressure holding position so as to maintain the pressure in the working chamber at the neutral pressure. The pressure holding mechanism includes a pilot operated operational one-way check valve which is designed to be maintained at shut-off position while the line pressure in the supply line of the pressure circuit is maintained lower than the neutral pressure. However, even in the modern technology, it is quite difficult to completely shut-off the pressure circuit and thus precisely maintain the fluid pressure in the working chamber at the neutral pressure. In other words, the fluid pressure can drop below the neutral pressure while the power supply is absent. Therefore, at the ON-set of the power supply to initiating pressure supply through the pressure circuit, the line pressure in the supply line is increased abruptly. However, since the operational check valve in the drain line is maintained shut-off position until the line pressure reaches the neutral pressure. As a result, at the initial stage of suspension control after resumption of power supply for the active suspension system, uncomfortable change of fluid pressure in the working chamber may be caused.

SUMMARY OF THE INVENTION

Therefore, it is an object of the present invention to provide enhanced suspension control characteristics at ON- and OFF-set transition of power supply.

In order to accomplish aforementioned and other objects, an active suspension system, according to the present invention, includes a pressure holding mechanism with a pressure holding valve means which is maintained in conductive state for a given period in which the fluid pressure in a working chamber is gradually adjusted toward a predetermined neutral pressure level after turning OFF of a power switch. The pressure holding valve is, on the other hand, maintained in non-conductive state for a given period until the fluid pressure is adjusted to the neutral pressure after turning ON of the power switch. A control means is provided for performing suspension control operation in response to various suspension control parameters for adjusting fluid pressure in a working chamber of a cylinder for regulating vehicular height and vehicular attitude. The control means being responsive to switching of the pressure holding valve from non-conductive state to conductive state for permitting pressure supply therethrough for maintaining a suspension control command value at a predetermined value essentially corresponding to a neutral pressure for a predetermined transition period so as to assure moderate increase of the fluid pressure.

According to one aspect of the invention, an active suspension system comprises:

a suspension system disposed between a vehicular body and a road wheel for damping energy for causing relative displacement between the vehicular body and the road wheel, the suspension system including means for defining a variable pressure chamber;

a fluid circuit for circulating pressurized fluid across the variable pressure chamber, the fluid circuit including a pressurized fluid source and a pressure control valve means for adjusting fluid pressure within the variable pressure chamber across a predetermined neutral pressure;

a flow control valve network disposed between the pressurized fluid source and the pressure control valve means in the fluid circuit for establishing and blocking fluid communication between the pressurized fluid source and the pressure control valve means, the flow control valve network further operating to blocking of fluid flow back to the pressurized fluid source from the pressure control valve when the line pressure supplied to the pressure control valve is lower than the neutral pressure;

a sensor means for monitoring vehicular driving parameter affecting vehicular attitude for producing a sensor signal indicative thereof;

a power supply circuit for supplying an electric power to the fluid pressure source for driving the latter;

a detector means for monitoring state of fluid flow for detecting line pressure to be supplied to the pressure control valve higher than the neutral pressure to produce a detector signal indicative thereof;

a control means responsive to the sensor signal for deriving a suspension control command for controlling the pressure control valve for adjusting pressure in the variable pressure chamber for regulating vehicular height and vehicular attitude, the control unit being powered by the electric power supplied by the power supply circuit, the control means being responsive to initiation of power supply for maintaining the flow control valve network at flow blocking position until the line pressure at the pressure control valve is increased across the neutral pressure and maintaining the suspension control command value at a predetermined value for a predetermined period after placing the flow control valve network at a state permitting fluid flow thereacross.

According to another aspect of the invention, an active suspension system comprises:

a suspension system disposed between a vehicular body and a road wheel for damping energy for causing relative displacement between the vehicular body and the road wheel, the suspension system including means for defining a variable pressure chamber;

a fluid circuit, including a supply line for supplying pressurized fluid and a drain line for driving pressurized fluid, for circulating pressurized fluid through the supply line and the drain line across the variable pressure chamber, the fluid circuit including a pressurized fluid source and a pressure control valve means for adjusting fluid pressure within the variable pressure chamber across a predetermined neutral pressure;

a flow control means disposed between the pressurized fluid source and the pressure control valve means in the fluid circuit, the flow control means being operable between a first flow control mode for supplying line pressure for the pressure control valve at a first maximum flow rate and a second flow control mode for supplying line pressure for the pressure control valve at a second limited flow rate which is smaller than the first maximum flow rate;

a sensor means for monitoring vehicular driving parameter affecting vehicular attitude for producing a sensor signal indicative thereof;

a power supply circuit for supplying an electric power to the fluid pressure source for driving the latter so as to enable supply of pressurized fluid to the fluid circuit;

a detector means for monitoring state of fluid flow for detecting line pressure to be supplied to the pressure control valve higher than the neutral pressure to produce a detector signal indicative thereof;

a control means responsive to the sensor signal for deriving a suspension control command for controlling the pressure control valve for adjusting pressure in the variable pressure chamber for regulating vehicular height and vehicular attitude, the control unit being powered by the electric power supplied by the power supply circuit, the control means being responsive to initiation of power supply for maintaining the flow control means at the second flow control mode until the line pressure at the pressure control valve being increased across the neutral pressure and maintaining the suspension control command value at a predetermined value for a predetermined period after placing the flow control valve network at a state permitting fluid flow thereacross.

According to a further aspect of the invention, an active suspension system comprises:

a suspension system disposed between a vehicular body and a road wheel for damping energy for causing relative displacement between the vehicular body and the road wheel, the suspension system including means for defining a variable pressure chamber;

a fluid circuit, including a supply line for supplying pressurized fluid and a drain line for driving pressurized fluid, for circulating pressurized fluid through the supply line and the drain line across the variable pressure chamber, the fluid circuit including a pressurized fluid source and a pressure control valve means for adjusting fluid pressure within the variable pressure chamber across a predetermined neutral pressure;

a first flow control means disposed in the supply line between the pressurized fluid source and the pressure control valve means in the fluid circuit, the flow control means being operable between a first flow control mode for supplying line pressure for the pressure control valve at a first maximum flow rate and a second flow control mode for supplying line pressure for the pressure control valve at a second limited flow rate which is smaller than the first maximum flow rate;

a second flow control means disposed in the drain line between the pressure control valve and the pressurized fluid source, the second flow control means being responsive to the magnitude of line pressure supplied to the pressure control valve for switching position between a third flow control mode for permitting fluid flow thereacross for flowing back the working fluid drained from the pressure control valve to the pressurized fluid source while the line pressure supplied to the pressure control valve is maintained at least the neutral pressure, and a fourth flow control mode for blocking fluid flow therethrough while the line pressure supplied to the pressure control valve is maintained below the neutral pressure;

a sensor means for monitoring vehicular driving parameter affecting vehicular attitude for producing a sensor signal indicative thereof;

a power supply circuit for supplying an electric power to the fluid pressure source for driving the latter so as to enable supply of pressurized fluid to the fluid circuit;

a detector means for monitoring state of the second flow control means for detecting the second flow control means placed at the third flow control mode for producing a detector signal;

a control means responsive to the sensor signal for deriving a suspension control command for controlling the pressure control valve for adjusting pressure in the variable pressure chamber for regulating vehicular height and vehicular attitude, the control unit being powered by the electric power supplied by the power supply circuit, the control means being responsive to initiation of power supply for maintaining the flow control means at the second flow control mode until the detector signal is present and maintaining the suspension control command value at a predetermined value for a predetermined period after placing the flow control valve network at a state permitting fluid flow thereacross.

The control unit may be also designed to maintain operation until the line pressure at the pressure control valve is adjusted substantially at the neutral pressure after shutting down of power supply from the power supply circuit. In such case, the control means may set the predetermined value to be initially set as the suspension control command value at a value substantially corresponding to the neutral pressure.

In the preferred construction, the detector means may monitor fluid pressure level of fluid flowing back to the pressurized fluid source for detecting fluid communication back to the pressurized fluid source from the pressure control valve by detecting fluid pressure lower than a predetermined level which is set slightly lower than the neutral pressure.

The active suspension system may further comprise a fail-safe valve in the fluid circuit, and a fail detecting means for monitoring operation to detect failure of the active suspension system for producing a fail indicative signal, the control unit normally operates the fail safe valve to a first open position and responsive to the fail indicative signal for blocking fluid communication therethrough for forming closed circuit across the pressure control valve and the working chamber.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
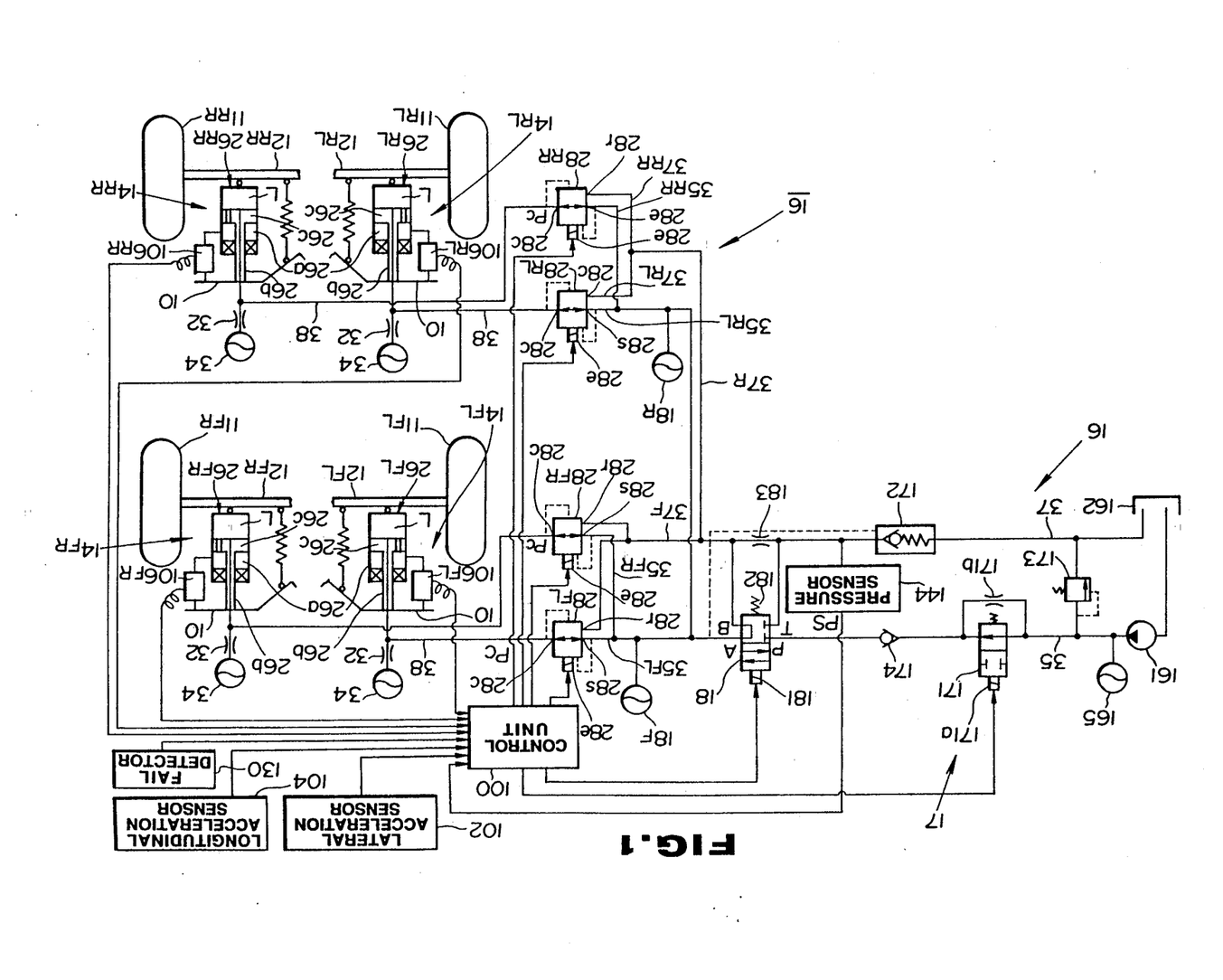
FIG. 1 is a diagrammatic illustration of the preferred embodiment of an active suspension control system, according to the present invention.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 12FL, 12FR, 12RL and 12RR provided in front-left, front-right, rear-left and rear-right suspension mechanism 14FL, 14FAR, 14RL and 14RR and rotatably supporting front-left, front-right, rear-left and rear-right wheels 11FL, 11FR, 11RL and 11RR. The suspension mechanism as generally referred to will be hereafter represented by the reference numeral "14". Respective front-left, front-right, rear-left and rear-right suspension mechanisms 14FL, 14FAR, 14RL and 14RR have hydraulic cylinders 26FL, 26FAR, 26RL and 26RR which will be represented by the reference numeral "26" as generally referred to.

Each of the hydraulic cylinder 26 is disposed between the vehicular body and the suspension member to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d. The piston 26c is connected to the associated one of suspension member 24 via a piston rod 26b. A suspension coil spring may also be provided in respective of suspension mechanisms. However, in contrast to the normal or ordinary suspension systems, the suspension coil spring to be employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected one of pressure control valves 28FL, 28FAR, 28RL and 28RR via a pressure control line 38. The pressure control valve 28FL, 28FAR, 28RL and 28RR will be hereafter represented by the reference numeral "28" as generally referred to. The pressure control valve 28 has a control port 28c communicated with the working chamber 26d via the pressure control line 38. The pressure control valve 28 also has an inlet port 28s and a drain port 28r. The inlet port 28s of the pressure control valve 28 is connected to o a pressure source unit 16 via a supply line 35, and the drain port 28r thereof is communicated with a drain line 37. The pressure control valve 28 incorporates a proportioning solenoid 28e for adjusting valve position according to magnitude of suspension control signal $I_{FL}$, $I_{FR}I_{RL}$ and $I_{RR}$ supplied from the control unit 100. The suspension control signal $I_{FL}$, $I_{FR}$, $I_{RL}$ and $[E]I[-]RR$ are current signal having a variable current value representative of commanding pressure in the working chamber. A branch circuit is provided for connecting the working chamber 38 to a pressure accumulator 34 via a flow path 33 and a flow restricting means, such as an orifice 32. This pressure accumulator 34 may be hereafter referred to as "low pressure accumulator". Another pressure accumulators 20F and 20R are provided in the supply line 35 for accumulating the excessive pressure generated in the pressure source unit 16.

The pressure control valves 2 comprise, though it is not clearly shown in FIG. 1, electrically or electromagnetically operable actuators, such as a proportioning solenoids. The hydraulic cylinder 26 and the pressure control valve 28 may be of any suitable constructions for adjusting damping characteristics with sufficiently high response. Typical constructions of the hydraulic cylinder 26 and the pressure control valve 28 have been disclosed in the following prior applications or publications:

U.S. patent application Ser. No. 052,934, filed on May 22, 1989;

U.S. patent application Ser. No. 059,888, filed on June 9, 1987, corresponding European Patent Application has been published as First Publication No. 02 49 209;

U.S. patent application Ser. No. 060,856, filed on June 12, 1987, corresponding European Patent Application has been published as First Publication No. 02 49 227;

U.S. patent application Ser. No. 060,909, filed on June 12, 1987;

U.S. patent application Ser. No. 060,911, filed on June 12, 1987;

U.S. patent application Ser. No. 176,24, filed on Mar. 31, 1988, the corresponding European Patent Application has been published as First Publication No. 02 85 153;

U.S. patent application Ser. No. 178,066, filed on Apr. 5, 1988, the corresponding European Patent Application has been published as First Publication No. 02 86 072;

U.S. patent application Ser. No. 167,835, filed on Mar. 4, 1988;

U.S. patent application Ser. No. 244,008, filed on Sept. 14, 1988;

U.S. patent application Ser. No. 255,560, filed on Oct. 11, 1988;

U.S. patent application Ser. No. 266,763, filed on Nov. 3, 1988;

U.S. patent application Ser. No. 261,870, filed on Oct. 25, 1988;

U.S. patent application Ser. No. 263,764, filed on Oct. 28, 1988;

U.S. patent application Ser. No. 277,376, filed on Nov. 29, 1988;

U.S. patent application Ser. No. 303,338, filed on Jan. 26, 1989;

U.S. patent application Ser. No. 310,130, filed on Mar. 22, 1989;

U.S. patent application Ser. No. 327,460, filed on Mar. 22, 1989;

U.S. patent application Ser. No. 303,339, filed on Jan. 26, 1989;

U.S. patent application Ser. No. 331,602, filed on Mar. 31, 1989;

U.S. patent application Ser. No. 331,653, filed Mar. 31, 1989;

U.S. patent application Ser. No. 364,477, filed on June 12, 1989;

U.S. patent application Ser. No. 365,468, filed on June 12, 1989;

The disclosures of the above-identified copending U.S. patent applications and corresponding publications are herein incorporated by reference for the sake of disclosure.

The pressure source unit 16 includes a fluid pump 161 which is drivingly associated with the output shaft of an automotive engine (not shown) to be driven by the driving torque of the engine. The fluid pump 161 is connected to a fluid reservoir 162 via a suction line to suck a working fluid stored in the fluid reservoir 162. The pressure source unit 16 also includes a surge valve for preventing surge flow of the pressurized fluid, a pressure regulating accumulator 165, a fluid filter and a by-pass path with an one-way check valve.

The shown circuit includes a pressure holding section 17 which includes a fluid flow rate adjusting stage 170. The flow rate adjusting stage 170 includes a flow control valve 171. The pressure holding section 17 also includes a pilot operated operational check valve 172, a pressure relief valve 173. The pressure relief valve 173 is set a predetermined set pressure for determining a maximum level of line pressure in the supply line 35. The operational check valve 172 is connected to the supply line in a pilot port for introducing therefrom the line pressure as a pilot pressure $P_P$. In general, the operational check valve 172 is responsive to the pilot pressure $P_P$ higher than the aforementioned neutral pressure $P_N$ to permit the working fluid in the drain line 37 to flow returning to the fluid reservoir 162 via a fluid filter 168. On the other hand, when the pilot pressure $P_P$ introduced from the supply line 35 is lower than the neutral pressure $P_N$, the operational check valve 172 is maintained in flow blocking position for blocking fluid flow through the drain line 37.

The flow control valve 171 incorporates an electromagnetic actuator 171a connected to the control unit 100 and is designed to be controlled the valve position by a flow control signal $CS_2$ supplied from the control unit. In brief, the flow control valve 171 is designed to be placed at flow blocking position for a given period after turning of an ignition switch (not shown) from OFF to ON. While the flow control valve 171 is maintained in flow blocking position, the pressurized fluid is supplied only through a flow restriction orifice 171b. Therefore, at this valve position, limited flow rate of the working fluid flows through the supply line 35.

A fail-safe valve 18 is provided downstream of the flow rate adjusting section 17. The fail-safe valve 18 comprises a spring off-set type four port, two position valve which has a P port connected to an one-way check valve 174 in the flow rate adjusting section 17. The fail-safe valve 18 also has A port connected to the inlet ports 28s of respective pressure control valves 28, B port connected to the drain ports 28r of the pressure control valves 28, and B port connected to inlet port of the operational check valve 172. The fail-safe valve 18 incorporates an electromagnetic actuator 181 connected to the control unit to be controlled the valve position by a fail-safe signal $CS_1$.

While the fail-safe signal $CS_1$ is maintained HIGH level to maintain the actuator 181 at energized state the fail-safe valve 18 establishes fluid communication between the P port and A port for supplying the line pressure to the pressure control valves 28. At the same time, the B port and R port are also communicated to permit fluid in the drain line 37 to flow therethrough. On the other hand, when the fail-safe signal $CS_1$ is maintained LOW level to maintain the actuator 181 deenergized position, the fail-safe valve 18 is placed at the flow blocking position by a force of a return spring 182. At this position, the fluid flow through the supply line 35 is thus blocked. Also, since the R port is disconnected from the B port, the fluid in the drain line 37 is permitted only through a flow restriction orifice 183.

At the position between the pressure control valve 28 and the fail-safe valve 18, the supply line 35 is branched into front-left, front-right, rear-left and rear-right branches 35FL, 35FR, 35RL and 35RR respectively connected to the inlet ports 28s of the front-left, front-right, rear-left and rear-right pressure control valves 28FL, 28FR, 28RL and 28RR. Similarly, the drain line 37 is branched into front-left, front-right, rear-left and rear-right branches 37FL, 37FR, 37RL and 37RR respectively connected to the drain ports 28r of the front-left, front-right, rear-left and rear-right pressure control valves 28FL, 28FR, 28RL and 28RR. The pressure accumulator 20F is connected to the upstream of a junction of the front-left and front-right branches 35FL and 35FR. Also, the pressure accumulator 20R is connected to the upstream of a junction of the rear-left and rear-right pressure control valves 35RL and 35RR. On the other hand, at a downstream of the junction between the front-left and front-right branches 37FL and 37FR of the drain line 37 is connected to the pressure accumulator 18F via an one-way check valve 36F. Similarly, at a downstream of the junction between the rear-left and rear-right branches 37RL and 37RR of the drain line 37 is connected to the pressure accumulator 18R via an one-way check valve 36R. Between the junctions where the branched drain lines 37F and 37R are connected to the pressure accumulators 18F and 18R and the B port of the fail-safe valve 18, flow restriction orifices 22F and 22R and pressure accumulators 24F and 24R are provided for absorbing back pressure in the drain line.

The actuators of the pressure control valves 28, the flow control valve 171 and the fail-safe valve 18 are connected to a microprocessor based control unit 100. The control unit 100 is connected to a lateral acceleration sensor 102, a longitudinal acceleration sensor 104, height sensors 106FL, 106FR, 106RL and 106RR. As is well known, the lateral acceleration sensor 102 monitors a lateral acceleration exerted on the vehicular body to produce a lateral acceleration indicative signal $g_y$.

Similarly, the longitudinal acceleration sensor 104 monitors a longitudinal acceleration exerted on the vehicle body to produce a longitudinal acceleration indicative signal $g_x$. The height sensors 106FL, 106FR, 106RL and 106RR are provided at respective positions where front-left, front-right, rear-left and rear-right suspension mechanisms 14FL, 14FR, 14RL and 14RR are provided. The height sensors 106FL, 106FR, 106RL and 106RR monitor relative distance between the vehicular body and associated one of the suspension members of the suspension mechanisms 14FL, 14FR, 14RL and 14RR to produce front-left, front-right, rear-left and rear-right height indicative signals $H_{FL}$, $H_{FR}$, $H_{RL}$ and $H_{RR}$.

Figure 2:
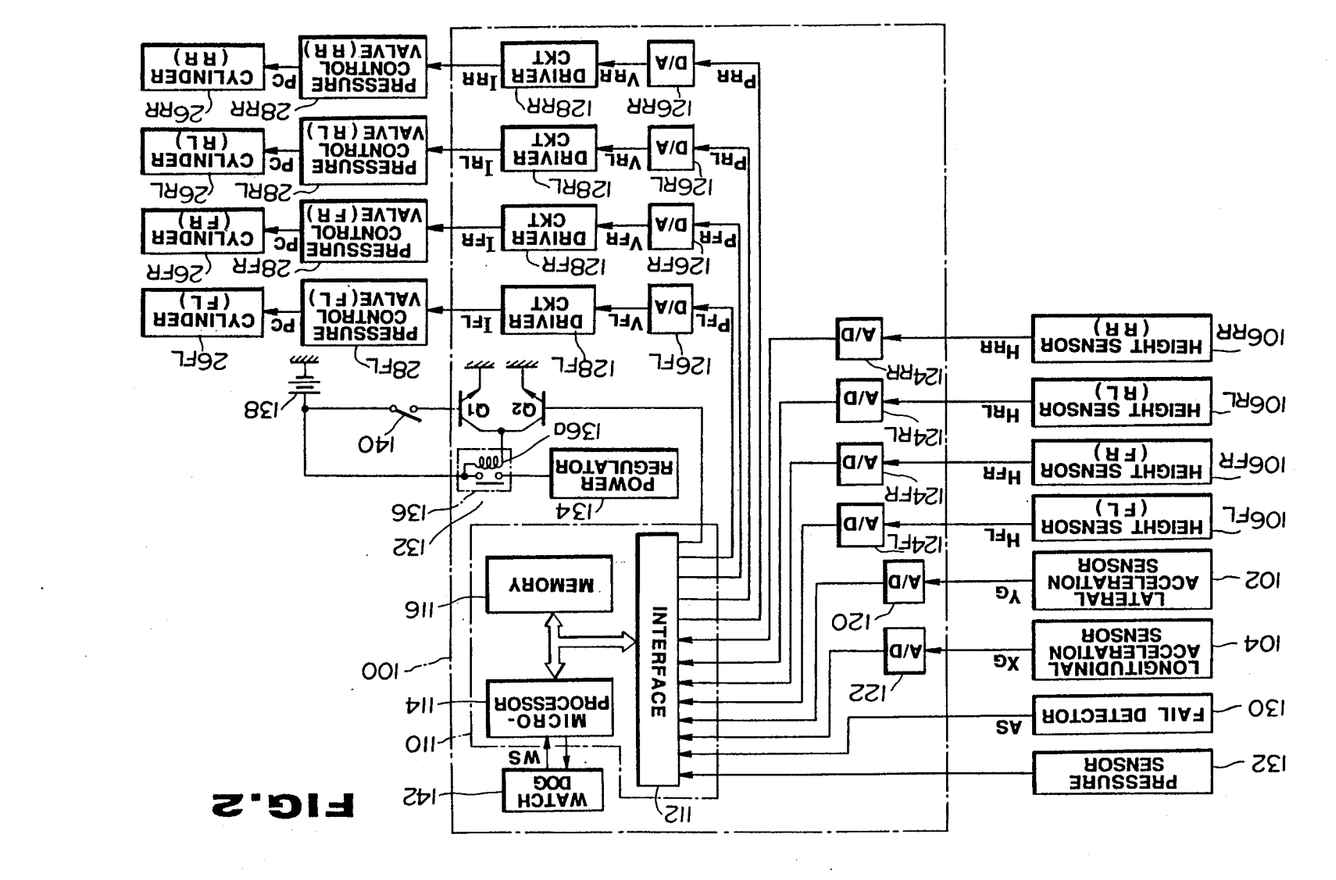
FIG. 2 is a block diagram showing a preferred construction of a control system associated with the preferred embodiment of the active suspension system of FIG. 1.

As shown in FIG. 2, the control unit 100 comprises a microcomputer 110 which includes an input/output interface 112, a microprocessor 114 and a memory unit 116. The lateral acceleration sensor 102 is connected to the input/output interface 112 of the microcomputer 110 via an analog-to-digital (A/D) interface 120. The A/D converter 120 converts the analog form lateral acceleration indicative signal $g_y$ into a lateral acceleration indicative digital signal.

On the other hand, the longitudinal acceleration sensor 104 is connected to the input/output interface 112 via an A/D converter 122. The A/D converter 122 converts the analog form longitudinal acceleration indicative signal $g_x$ into a digital form longitudinal acceleration indicative digital signal. Also, respective of the front-left, front-right, rear-left and rear-right height sensors 106FL, 106FR, 106RL and 106RR are connected to the input/output interface 112 via A/D converters 124FL, 124FR, 124RL and 124RR. The A/D converters 124FL, 124FR, 124RL and 124RR converts analog form front-left, front-right, rear-left and rear-right height indicative signals $H_{FL}$, $H_{FR}$, $H_{RL}$ and $H_{RR}$ into digital form height indicative digital signals. The microcomputer 110 processes the lateral acceleration indicative digital signals, the longitudinal acceleration digital signals and the front-left, front-right, rear-left and rear-right height indicative digital signals for deriving front-left, front-right, rear-left and rear-right suspension control commands $P_{FL}$, $P_{FR}$, $P_{RL}$ and $P_{RR}$. The suspension control commands $P_{FL}$, $P_{FR}$, $P_{RL}$ and $P_{RR}$ are converted into voltage signals $V_{FL}$, $V_{FR}$, $V_{RL}$ and $V_{RR}$ respectively representative of the commanded value of the suspension control commands, by digital-to-analog (D/A) converters 126FL, 126FR, 126RL and 126RR. The voltage signals $V_{FL}$, $V_{FR}$, $V_{RL}$ and $V_{RR}$ are supplied to driver circuits 128FL, 128FR, 128RL and 128RR. The driver circuits 128FL, 128FR, 128RL and 128RR derives the suspension control signals $I_{FL}$, $I_{FR}$, $I_{RL}$ and $I_{RR}$ which are current signal having current level corresponding to the magnitude of adjustment of the fluid pressure.

Figure 3:
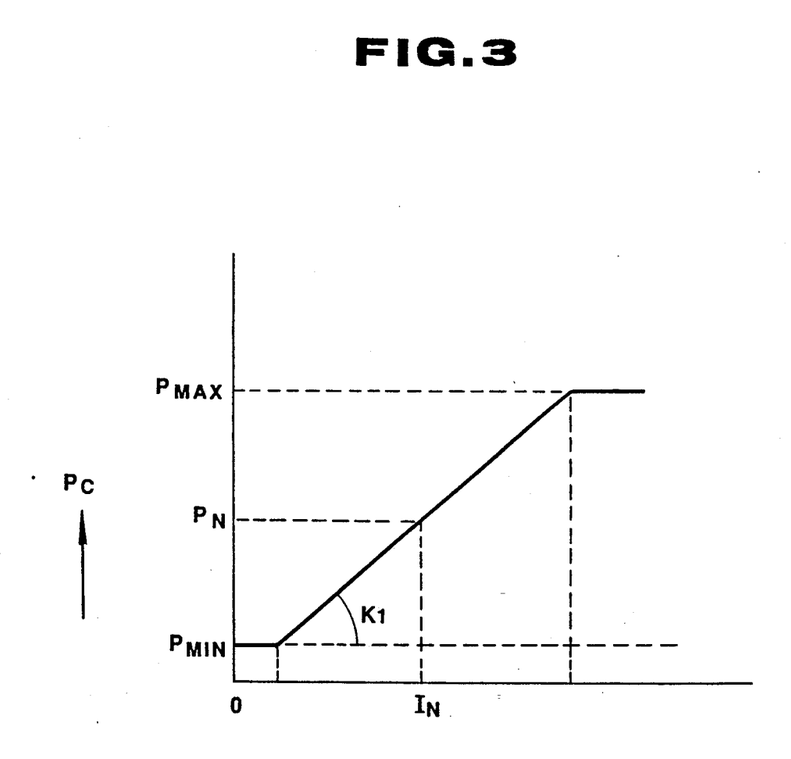
FIG. 3 is a chart showing relationship between current level of a suspension control command and fluid pressure in a working chamber in the preferred embodiment of the active suspension system.

As can be seen from FIG. 3, the current value of the suspension control signal as the current signal is variable between a predetermined minimum value $I_{MIN}$ and a predetermined maximum value $I_{MAX}$. The fluid pressure becomes minimum $P_{MIN}$ at the minimum value $I_{MIN}$ of the suspension control command and becomes maximum $P_{MAX}$ at the maximum value $I_{MAX}$ of the suspension control command. The minimum value $I_{MIN}$ of the suspension control command is set in view of noise possible superimposed on the suspension control current. As can be seen, the fluid pressure in the working chamber 26d of the hydraulic cylinder 26 linearly varies between the maximum pressure level $P_{MAX}$ and the minimum pressure level $P_{MIN}$ across a predetermined neutral pressure $P_N$ corresponding to the current level $I_N$.

A fail detector 130 is also provided in the suspension control system for monitoring operating condition and detecting abnormal condition of the system to input an abnormality detection signal AS to the input/output interface 112. Furthermore, a power circuit 132 is connected to the control unit 100. The power circuit 132 includes a power regulator 134 and an ignition relay 136. The ignition relay 136 has a relay coil 136a [E] connected to a vehicular battery 138. The other end of the relay coil 136a is connected to collector electrodes of a pair of transistors $Q_1$ and $Q_2$. The transistor $Q_1$ has the base electrode connected to the battery 138 via an ignition switch 140. On the other hand, the transistor $Q_2$ has the base electrode connected to the input/output interface 112 to receive therefrom a self-holding signal $S_S$. The microprocessor 110 is also connected to a watch dog timer 142 which receives periodic signal internally produced in the microprocessor for checking the operation of the control unit. The watch dog timer 142 is connected to NMI (non-maskable interrupt) terminal of the microprocessor for supplying an abnormality indicative signal when failure of the control unit is detected. A pressure sensor 144 is also connected to the control unit 100. The pressure sensor 144 is designed for monitoring pressure at the upstream of the operational one-way check valve 172 in the drain line 37. The pressure sensor 144 outputs pressure level indicative signal PS variable between HIGH and LOW level. In the show embodiment, the pressure sensor 144 is designed to output HIGH level pressure level indicative signal PS when the pressure at the upstream of the operational one-way check valve 172 drops below a set pressure $P_{set}$ which is set at a pressure level lower than the neutral pressure $P_N$. This pressure sensor 144 thus serves as means for detecting opening of the operational one-way check valve 172 by detecting temporary drop of the fluid pressure in the drain line upon opening of the operational check valve 172.

In brief of the operation, the control unit 100 initiate operate in response to turning on of the ignition switch 140. At the initial stage, whole system is initialized. At this initialization stage, the fail-safe signal $CS_1$ and the flow control signal $CS_2$ are turned into HIGH level. At the same time, the initial suspension control command $P_{FL}$, $P_{FR}$, $P_{RL}$ and $P_{RR}$ are set at a predetermined initial values $P_{FL}'$, $P_{FR}'$, $P_{RL}'$ and $P_{RR}'$. The suspension control commands $P_{FL}$, $P_{FR}$, $P_{RL}$ and $P_{RR}$ having the predetermined initial value $P_{FL}'$, $P_{FR}'$, $P_{RL}'$ and $P_{RR}'$ are thus supplied to the driver circuits 128FL, 128FR, 128RL and 128RR via respectively corresponding D/A converters 126FL, 126FR, 126RL and 126RR. For an ON-set period, the values of the suspension control commands $P_{FL}$, $P_{FR}$, $P_{RL}$ and $P_{RR}$ are maintained at the predetermined initial values $P_{FL}'$, $P_{FR}'$, $P_{RL}'$ and $P_{RR}'$. During the On-set period, the fail-safe signal $CS_1$ and the flow control signal $CS_2$ are maintained HIGH level to maintain the fail-safe valve 18 at open position and the flow control valve 171 at closed position. During this ON-set period, the line pressure is increased at a limited rate by the fluid supplied through the flow restriction orifice 171b. When the line pressure is increased across the set pressure of the operational one-way check valve 172, the operational one-way check valve opens to causedrop of the fluid pressure in the drain line across the set pressure $P_{set}$ of the pressure sensor 144. As a result, the pressure level indicative signal level PS is switched into HIGH level.

When the pressure level indicative signal PS turns into HIGH level, the control unit 100 switches the flow control signal level CS$_2$ into HIGH level. Therefore, the flow control valve 171 is switched into open position for permitting pressurized fluid to flow through the supply line at full flow rate. Then, the control unit is enabled to perform normal height and vehicular attitude regulating control operation. In the normal mode of control operation, the height indicative data H$_{FL}$, H$_{FR}$, H$_{RL}$ and H$_{RR}$ are read out, Then height regulating control operation is performed by the the control unit 100. On the height regulating control operation, the respective of the height indicative data H$_{FL}$, H$_{FR}$, H$_{RL}$ and H$_{RR}$ is compared with a predetermined target height H$_S$ so that the suspension control command P$_{FL}$, P$_{FR}$, P$_{RL}$ and P$_{RR}$ necessary for adjusting the height to the target height are generated. Also, anti-rolling and anti-pitching control for regulating vehicular attitude is performed on the basis of the lateral and longitudinal acceleration data Y$_G$ and X$_G$. In the anti-rolling and anti-pitching control, anti-pitching control command P$_{YG}$ and anti-pitching control command P$_{XG}$ are derived for suppressing vehicular rolling and pitching motion.

On the other hand, when the ignition switch 140 is turned OFF, the suspension control commands P$_{FL}$, P$_{FR}$, P$_{RL}$ and P$_{RR}$ are gradually adjusted toward the predetermined initial value P$_K$. Simultaneously, the position of the ignition switch 140 is continuously monitored in order to detect turning ON the same again. When the ignition switch is turned ON before the suspension control commands P$_{FL}$, P$_{FR}$, P$_{RL}$ and P$_{RR}$ are adjusted to the predetermined value P$_K$, then the current suspension command values upon ON-set of the ignition switch are taken as the initial command value.

On the other hand, the microprocessor 110 is responsive to the abnormality indicative signal AS from the fail detector or from the watch dog timer to initiate fail-safe operation. In the fail-safe operation, the fail-safe signal CS$_1$ is turned into LOW level to place the fail-safe valve 18 at the flow blocking position.

The following is a detail of the suspension control routine to be executed by the control unit 100 in the shown embodiment of the active suspension system, according to the invention.

Figure 4:
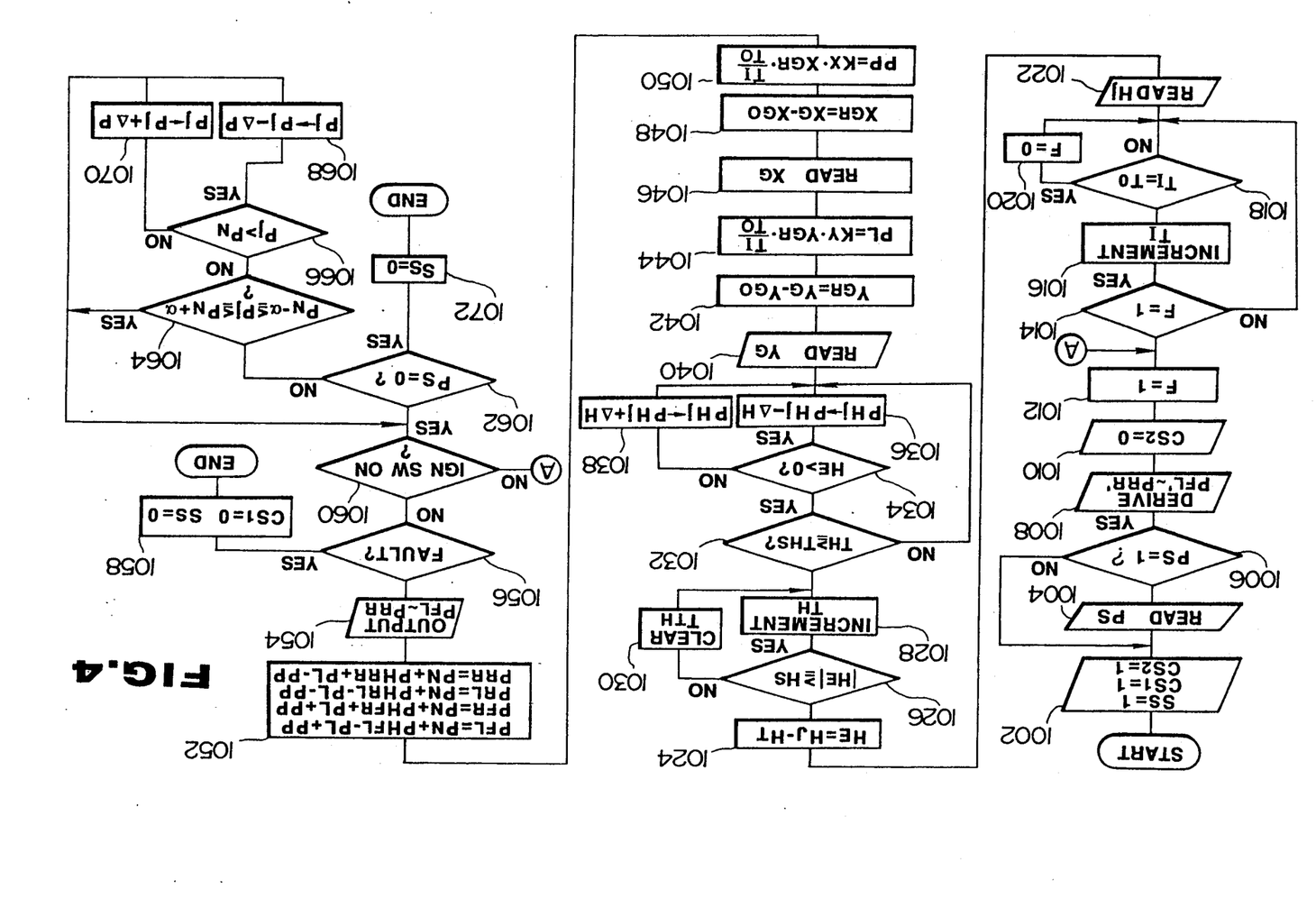
FIG. 4 is a flowchart showing a rolling control routine for deriving the suspension control command.

FIG. 4 shows a routine to be executed by the microprocessor 110 in the control unit 100 of the shown embodiment of the active suspension system. As can be appreciated, the shown routine may be programmed as one of interrupt routines to be executed by interrupting a main program which governs a plurality of routines. Therefore, the shown routine may be executed periodically at a given interval.

Initially, the shown routine is triggered in response to turning ON of the ignition switch 140. Namely, upon ON-set of the ignition switch 140, the transistor Q$_1$ of the power circuit 132 is turned ON. In response to this, the ignition relay 136 is turned ON. Therefore, power supply for the control unit 100 is initiated.

Immediately after starting execution, the fail-safe signal CS$_1$, the flow control signal CS$_2$ and the self-holding signal S$_S$ are respectively switched into HIGH level at a step 1002. By this, the fail-safe valve 18 is placed at open position for permitting fluid flow through the supply line 35 and the drain line 37. On the other hand, the flow control valve 171 is responsive to the HIGH level flow control signal CS$_2$ to be placed at the flow blocking position. Therefore, the pressurized fluid flows only through the flow restriction orifice 171b for supplying limited flow rate of the working fluid for the pressure control valves 28FL, 28FR, 28RL and 28RR. Then, at a step 1004, the pressure level indicative signal PS is read out. The pressure level indicative signal level PS is then checked whether is is HIGH level, at a step 1006. The steps 1004 and 1006 are repeated until the pressure level indicative signal level PS is turned into HIGH level. Namely, since the pressure level indicative signal PS is switched into HIGH level in response to opening of the operational one-way check valve 172, the process at the steps 1004 and 1006 are repeated until the operational one-way check valve is placed at the conductive state to permit fluid flow therethrough. In other words, since the operational one-way check valve 172 is set the set pressure substantially corresponding to the neutral pressure P$_N$, the pressure level indicative signal PS represents the line pressure in the supply line which is supplied to the operational one-way check valve as the pilot pressure P$_P$, reaches the neutral pressure.

Subsequently, the suspension control commands P$_{FL}$, P$_{FR}$, P$_{RL}$ and P$_{RR}$ are set at an initial values P$_{FL}'$, P$_{FR}'$, P$_{RL}'$ and P$_{RR}'$ at a step 1008.

Here, in general, the suspension control command values P$_{FL}$, P$_{FR}$, P$_{RL}$ and P$_{RR}$ are derived on the basis of the neutral pressure P$_N$, height control value PH$_{FL}$, PH$_{FR}$, PH$_{RL}$ and PH$_{RR}$ which are derived on the basis of the difference between the target height H$_S$ and the height indicative data H$_{FL}$, H$_{FR}$, H$_{RL}$ and H$_{RR}$, the anti-rolling control value P$_{YG}$, the anti-pitching control value P$_{XG}$, and off-set command value PO$_{FL}$, PO$_{FR}$, PO$_{RL}$ and PO$_{RR}$ which represents required off-set pressure from the neutral pressure P$_N$ set for compensating lag time of pressure adjustment. The manner of derivation of the suspension control commands P$_{FL}$, P$_{FR}$, P$_{RL}$ and P$_{RR}$ can be expressed by the following equations:

$$P_{FL} = P_N + PH_{FL} - P_{YG} - P_{XG} - PO_{FL} \quad (1)$$

$$P_{FR} = P_N + PH_{FR} - P_{YG} - P_{XG} - PO_{FR} \quad (2)$$

$$P_{RL} = P_N - PH_{RL} - P_{YG} - P_{XG} - PO_{RL} \quad (3)$$

$$P_{RR} = P_N + PH_{RR} - P_{YG} + P_{XG} + PO_{RR} \quad (4)$$

Here, at the initial stage upon ON-set of the ignition switch 140, the height control values PH$_{FL}$, PH$_{FR}$, PH$_{RL}$ and PH$_{RR}$, the anti-rolling control value P$_{YG}$ and the anti-pitching control value P$_{XG}$ are maintained zero (0). Therefore, assuming the initial off-set value PO$_{FL}$, PO$_{FR}$, PO$_{RL}$ and PO$_{RR}$ are respectively P$_I$, the foregoing equation can be modified for deriving the initial suspension control command values P$_{FL}'$, P$_{FR}'$, P$_{RL}'$ and P$_{RR}'$ $$P_{FL} = P_N + P_I \quad (5)$$

$$P_{FR} = P_N + P_I \quad (6)$$

$$P_{RL} = P_N - P_I \quad (7)$$

$$P_{RR} = P_N + P_I \quad (8)$$

Therefore, at the step 1008, the suspension control command values P$_{FL}'$, P$_{FR}'$, P$_{RL}'$ and P$_{RR}'$ are derived by the foregoing equations (5) to (8). Thereafter, at a step

1010, the flow control signal $CS_2$ is switched into LOW level to place the flow control valve 171 at the open position. Then, an initial stage indicative flag F is set at a step 1012. At a step 1014, the initial stage indicative flag F is checked whether it is set or not. When the initial stage indicative flag F is set as checked at the step 1014, then an initial period timer value $I_T$ incremented at a step 1016. The initial period timer value $I_T$ is compared with a predetermined set initial period value $T_O$ which represents an ON-set period for maintaining the pressure holding mechanism 17 at the pressure holding position after switching of the ignition switch 140 into ON position, at a step 1018. In practice, the ON-set period is set at several seconds in the preferred embodiment. When the initial period timer value $I_T$ is smaller than the set initial period value $T_O$, the process goes to a step 1022 to read the the height indicative data $H_{FL}$, $H_{FR}$, $H_{RL}$ and $H_{RR}$ which will be generally represented by $H_j$. On the other hand, when the initial period timer value $I_T$ is greater than or equal to the set initial period value $T_O$, the initial period indicative flag F is reset at a step 1020. Then process goes to the step 1022 set forth above.

At a step 1024, the height indicative data $H_j$ as read at the step 1022 are compared with a target height representative value $T_H$ which represents a predetermined target height $H_S$. Thereafter, at the step 1024, difference values $H_E$ between the instantaneous height as represented by height indicative data $H_{FL}$, $H_{FR}$, $H_{RL}$ and $H_{RR}$ and the target height $H_S$ as represented by the target height representative value $T_H$ can be derived. Thereafter, the absolute value of the height difference $|H_{E1}|$ is compared the target height range indicative value $H_S$, at a step 1026. When the absolute value $|H_E|$ of the height difference is greater than the target height range indicative value $H_S$, a height adjustment timer $T_H$ is incremented by one at a step 1028. On the other hand, when the absolute value $|H_E|$ of the height difference is smaller than or equal to the target height value $H_S$, the height adjustment timer value $T_H$ is cleared at a step 1030.

Then, at a step 1032, the height adjustment timer value $T_H$ is compared with the height adjustment threshold value $T_{TH}$. If the height adjustment timer value $T_H$ as checked at the step 1032 is greater than or equal to the height adjustment threshold value $T_{TH}$, then, the height difference $H_E$ is checked whether it is zero (0) or not at a step 1034. Thereafter, at a step 1036, the height control command value $PH_{FL}$, $PH_{FR}$, $PH_{RL}$ and $PH_{RR}$ which will be generally represented by $PH_j$, are derived by subtracting the height variation indicative value $\Delta H$ from the previously derived height control command value derived in the immediately preceding execution cycle. Otherwise, at a step 1038, the height control command value $PH_j$, are derived by adding the height variation indicative value $\Delta H$ to the previously derived height control command value derived in the immediately preceding execution cycle.

When the height adjustment timer value $T_H$ is smaller than the height adjustment threshold value $T_{TH}$ as checked at the step 1032 or after the process at one of the steps 1036 and 1038, the lateral acceleration indicative data $Y_G$ which is derived from the lateral acceleration indicative signal $y_g$ by A/D conversion, is read out at a step 1040. Based on the lateral acceleration indicative data $Y_G$, a rolling magnitude indicative data $Y_{GR}$ is derived. Practically, the rolling magnitude indicative data $Y_{GR}$ is derived by subtracting a neutral position lateral acceleration value $Y_{GO}$ from the instantaneous lateral acceleration indicative data $Y_G$ at the position where the lateral acceleration on the vehicular body is zero (0) from the lateral acceleration indicative data $Y_G$, at a step 1042. By this, the rolling magnitude indicative data $Y_{GR}$ represents both of the vehicular rolling magnitude and the vehicular rolling direction. Thereafter, by multiplying the rolling magnitude indicative data $Y_G$ with a control coefficient $K_Y$ and ($I_T/T_O$), anti-rolling control command value $P_L$ is derived at a step 1044. The longitudinal acceleration indicative data $X_G$ which is derived from the longitudinal acceleration indicative signal $x_g$ by A/D conversion, is read out at a step 1046. Based on the longitudinal acceleration indicative data $X_G$, a pitching magnitude indicative data $X_{GR}$ is derived. Practically, the pitching magnitude indicative data $X_{GR}$ is derived by subtracting a neutral position longitudinal acceleration value $X_{GO}$ at the position where the longitudinal acceleration on the vehicular body is zero (0) from the longitudinal acceleration indicative data $X_G$, at a step 1048. By this, the pitching magnitude indicative data $X_{GR}$ represents both of the vehicular pitching magnitude and the vehicular pitching direction. Thereafter, by multiplying the pitching magnitude indicative data $X_{GR}$ with a control coefficient $K_X$ and ($I_T/T_O$), anti-pitching control command value $P_P$ is derived at a step 1050.

After the process at the step 1050, the suspension control command values $P_{FL}$, $P_{FR}$, $P_{RL}$ and $P_{RR}$ are derived at a step 1052. The suspension control command $P_{FL}$, $P_{FR}$, $P_{RL}$ and $P_{RR}$ with the control valve thus derived are output at a step 1054.

At a step 1056, the abnormality indicative signals from the fail detector 130 and the watch dog timer 142 are checked. If abnormality is detected at the step 1056, the fail-safe signal $CS_1$ is set at LOW level at the step 1058. At the same time, a self-holding signal $S_S$ for maintaining power supply for a predetermined OFF-set period after turning OFF of the ingnition switch 140, is switched into LOW level at the step 1058. Then, process goes END.

On the other hand, when the abnormality cannot be detected as checked at the step 1056, the position of the ignition switch 140 is checked at a step 1060. If OFF state of the ignition switch 140 is detected at the step 1060, then process returns to the step 1014. On the other hand, if the ignition switch 140 is in ON position, the level of the pressure level indicative signal PS is checked at a step 1062. When the pressure level indicative signal PS as checked at the step 1062 is LOW level, the suspension control command value $P_j$ is checked whether it is within a predetermined range $\pm \alpha$ of a predetermined set pressure $P_K$ at a step 1064. When the suspension control command $P_j$ is not within the predetermined range ($P_K - \alpha \leq P_j \leq P_K + \alpha$), then check is performed whether the suspension control command value $P_j$ is greater than the set pressure $P_N$ at a step 1066. When the suspension control command $P_j$ is greater than the neutral pressure $P_N$, then, the suspension control command value $P_j$ is derived by subtracting a predetermined value $\Delta P$ from the preceding value of the suspension control command derived in the immediately preceding cycle, at a step 1068. On the other hand, when the suspension control command value $P_j$ is smaller than the neutral pressure $P_N$ as checked at the step 1066, then the suspension control command value $P_j$ is derived by adding the predetermined value $\Delta P$ at a step 1070. After the process at one of the steps 1068 and 1070, or when the suspension control command is set within the predetermined range ($P_N - \alpha \leq P_j \leq P_N + \alpha$), process returns to the step 1062. Therefore, the process at the steps 1062 to 1070 are repeated until the pressure level indicative signal level PS becomes LOW level. On the other hand, when the pressure indicative signal level PS turns into LOW level, the self-holding signal $S_S$ is switched into LOW level at a step 1072. Thereafter, process goes END.

When the vehicle stops at a flat road with maintaining the ignition switch 140 at OFF position for period longer than the second end timer threshold $T_{ES2}$, the pressure source unit 16 is maintained inoperative position because of stopping of the engine. Therefore, the line pressure in the supply line 35 supplied from the pressure source unit 16 maintained zero. At this condition, due to the line pressure in the supply line lower than or equal to the neutral pressure, the operational one-way check valve 172 is maintained at shut-off state. At this time, the pressure level indicative signal PS is maintained at LOW level since the operational one-way check valve 172 stays at closed position for blocking fluid flow therethrough and thus the fluid pressure in the drain line 37 is maintained at higher level than the set pressure $P_{set}$ of the pressure sensor 144.

By turning ON of the ignition switch 140 at this position, power supply is initiated to resume control operation of the control unit 100. At the same time, the engine starts to run for driving the fluid pump 161. Therefore, supply pressure from the pressure source unit 16 is gradually increased according to increasing of the engine revolution speed. Also, the microprocessor 110 of the control unit 100 initiate suspension control operation.

At this state, since the pressure level indicative signal PS is maintained LOW level, both of the flow control signal $CS_2$ and the fail-safe signal $CS_1$ are set at HIGH level during initialization process at the step 1002. Therefore, the fail-safe valve 18 is operated into open position and the flow control valve 171 is operated into shut-off position. As a result, the fluid pressure supplied from the pressure source unit 16 is supplied to the pressure control valve 28 via the flow restriction orifice 171b. Therefore, limited flow rate of pressurized fluid is supplied to the pressure control valve 28 for moderately increase the fluid pressure. Accordingly, the fluid pressure in the working chamber 26d of respective cylinders 26 is also moderately increased.

When the line pressure is increased across the neutral pressure $P_N$, the operational one-way check valve 172 opens to permit the fluid flow through the drain line 37. As a result, the fluid pressure in the drain line drops below the set pressure $P_{set}$ by fluid communication of the drain line with the low pressure fluid reservoir. Then, HIGH level pressure level indicative signal PS is generated. In response to this, the flow control signal $CS_2$ is switched into LOW level to place the flow control valve 171 in conductive state for permitting fluid flow therethrough. Therefore, the pressure control valve 28 is enabled to control the fluid pressure in the working chamber.

On the other hand, as set forth above, the microprocessor 110 maintains the suspension control command values at the initial values $P_{FL}'$, $P_{FR}'$, $P_{RL}'$ and $P_{RR}'$ until the initial period timer value $I_T$ reaches the set initial timer value $T_{01066}$. Therefore, the suspension control signal values $I_{FL}$, $I_{FR}$, $I_{RL}$ and $I_{RR}$ output from the driver circuits 128FL, 128FR, 128RL and 128RR are maintained at the values corresponding the initial suspension control command values $P_{FL}'$, $P_{FR}'$, $P_{RL}'$ and $P_{RR}'$. As will be appreciated from the foregoing discussion, since the initial suspension control command values $P_{FL}'$, $P_{FR}'$, $P_{RL}'$ and $P_{RR}'$ are set at higher than the neutral pressure $P_N$ for the off-set pressure values $PO_j$. After expiration of the ON-set period as defined by the set initial period value $N_{SI}$, normal suspension control for regulating vehicular height and the vehicular attitude is performed. The height regulating control, anti-rolling control and anti-pitching control is performed on the basis of the height indicative data $H_j$, the lateral acceleration indicative data $Y_G$ and the longitudinal acceleration indicative data $X_G$. Manner of height regulation control, anti-rolling control and anti-pitching control have been disclosed in various foregoing co-pending U.S. patent applications. Therefore, all disclosures touching height regulation control, anti-rolling control, anti-pitching control and so forth discussed in the associated U.S. patent applications are herein incorporated by reference for the sake of disclosure.

On the other hand, when the ignition switch 140 is turned OFF, the engine stops running. Accordingly, the fluid pump 161 in the pressure source unit 16 cease driving. However, by the effect of the one-way check valve 174 in the pressure holding mechanism 17, the abrupt drop of the line pressure at the pressure control valves 28 can be successfully prevented.

On the other hand, since the self-holding signal $S_S$ is maintained HIGH level for the given OFF-set period until the operational one-way check valve 172 is shut and thus the pressure level indicative signal level turns into LOW level, for gradually adjusting the line pressure at the pressure control valves 28 substantially at or in the vicinity of the neutral pressure. Subsequently, when the line pressure drops to the neutral pressure $P_N$, the operational one-way check valve switches the valve position to flow blocking state. At this position, since part of the fluid in the drain line 37 flows into the back pressure absorbing pressure accumulators 24F and 24R, the pressure at the pressure control valve is maintained slightly lower than the neutral pressure $P_N$.

On the other hand, when the failure of the system is detected by the fail detector 130, the fail-safe signal $CS_1$ is switched into LOW level to place the fail-safe valve 18 at the flow blocking state. At the same time, since the self-holding signal $S_S$ is switched into LOW level, the power supply for the control unit 100 is shut down. at the same time, the pressure source unit 16 is shut down to stop pressure supply. Then, since the inlet port of the pressure control valve comes into communication with the operational check valve 172 via the flow restriction orifices 183. Therefore, the pilot pressure $P_P$ corresponding to the line pressure in the supply line drops to the neutral pressure $P_N$ to cause shutting down of the operational one-way check valve. Therefore, the hydraulic circuit across the working chamber and the pressure control valves becomes closed. Therefore, the pressure in the closed circuit can be maintained slightly below or in the vicinity of the neutral pressure.

At this condition, when the vehicular load is substantially standard, the vehicular height can be maintained in the vicinity of the target height. Furthermore, shock absorbing effect substantially equivalent to the conventional passive type shock absorber can be achieved by inducing fluid flow with flow restriction in the closed circuit.

As can be appreciated herefrom since the flow control valve can be maintained at shut-off position to increase line pressure to be supplied to the pressure control valve moderately until the line pressure reaches in the vicinity of the neutral pressure, and subsequently maintaining the suspension control command at the initial value set substantially at the neutral pressure, abrupt change of the line pressure which leads abrupt change of the vehicular height can be successfully prevented.

While the present invention has been discussed in terms of the preferred embodiment of the invention, the invention can be embodied in various fashion. Therefore, the invention should not be appreciated to be specified to the specific embodiment discussed hereabove. Therefrom the invention should cover all possible embodiments and modifications which can implemented without departing from the principle of the invention.

For instance, while the shown embodiment employs a pressure sensor for detecting of opening of the operational one-way check valve by detecting fluid pressure in the drain line upstream of the operational check valve, it is possible to detect opening of the operational one-way check valve by detecting the line pressure supplied to the pressure control valve slightly higher than the neutral pressure. Furthermore, it may be possible to directly monitor the valve position of the operational one-way check valve for generating the HIGH level pressure level indicative signal while the operational one-way check valve is maintained at open position. In addition, though the pressure holding mechanism in the shown embodiment comprises the electromagnetically operable flow control valve and the flow restrictive orifice, the flow control valve may also comprise a pilot operated valve. Furthermore, the position of the pressure holding mechanism may not be specified to the shown position but can be any appropriate position convenient for equivalent flow control operation. Furthermore, the flow restriction orifice is not essential to be provided. For example, when a flow restriction orifice is provided between the P port and A port of the fail-safe valve, the flow restriction orifice parallel to the flow control valve can be neglected. In addition, though the shown embodiment employs the engine driven fluid pump, it can be replaced with an electrically driven fluid pump. Also, the present invention may be implemented any type of pressure control valve or flow control servo unit performing equivalent pressure control function.

What is claimed is;

1. An active suspension system comprising:
   a suspension system disposed between a vehicular body and a road wheel for damping energy for causing relative displacement between the vehicular body and the road wheel, said suspension system including means for defining a variable pressure chamber;
   a fluid circuit for circulating pressurized fluid across said variable pressure chamber, said fluid circuit including a pressurized fluid source and a pressure control valve means for adjusting fluid pressure within said variable pressure chamber across a predetermined neutral pressure;
   a flow control valve network disposed between said pressurized fluid source and said pressure control valve means in said fluid circuit for establishing and blocking fluid communication between said pressurized fluid source and said pressure control valve means, said flow control valve network further operating to blocking of fluid flow back to said pressurized fluid source from said pressure control valve when the line pressure supplied to said pressure control valve is lower than said neutral pressure;
   a sensor means for monitoring vehicular driving parameter affecting vehicular attitude for producing a sensor signal indicative thereof;
   a power supply circuit for supplying an electric power to said fluid pressure source for driving the latter;
   a detector means for monitoring state of fluid flow for detecting line pressure to be supplied to said pressure control valve higher than said neutral pressure to produce a detector signal indicative thereof;
   a control means responsive to said sensor signal for deriving a suspension control command for controlling said pressure control valve for adjusting pressure in said variable pressure chamber for regulating vehicular height and vehicular attitude, said control unit being powered by the electric power supplied by said power supply circuit, said control means being responsive to initiation of power supply for maintaining said flow control valve network at flow blocking position until the line pressure at said pressure control valve is increased across said neutral pressure and maintaining said suspension control command value at a predetermined value for a predetermined period after placing said flow control valve network at a state permitting fluid flow thereacross.

2. An active suspension system as set forth in claim 1, wherein said control unit is also designed to maintain operation until the line pressure at said pressure control valve is adjusted substantially at said neutral pressure after shutting down of power supply from said power supply circuit.

3. An active suspension system as set forth in claim 2, wherein said control means sets said predetermined value to be initially set as said suspension control command value at a value substantially corresponding to said neutral pressure.

4. An active suspension system as set forth in claim 3, wherein said detector means monitors fluid pressure level of fluid flowing back to said pressurized fluid source for detecting fluid communication back to said pressurized fluid source from said pressure control valve by detecting fluid pressure lower than a predetermined level which is set slightly lower than said neutral pressure.

5. An active suspension system as set forth in claim 1, which further comprises a fail-safe valve in said fluid circuit, and a fail detecting means for monitoring operation to detect failure of the active suspension system for producing a fail indicative signal, said control unit normally operates said fail-safe valve to a first open position and responsive to said fail indicative signal for blocking fluid communication therethrough for forming closed circuit across said pressure control valve and said working chamber.

6. An active suspension system comprising:
   a suspension system disposed between a vehicular body and a road wheel for damping energy for causing relative displacement between the vehicular body and the road wheel, said suspension system including means for defining a variable pressure chamber;
   a fluid circuit, including a supply line for supplying pressurized fluid and a drain line for driving pressurized fluid, for circulating pressurized fluid through said supply line and said drain line across said variable pressure chamber, said fluid circuit including a pressurized fluid source and a pressure control valve means for adjusting fluid pressure within said variable pressure chamber across a predetermined neutral pressure;

a flow control means disposed between said pressurized fluid source and said pressure control valve means in said fluid circuit, said flow control means being operable between a first flow control mode for supplying line pressure for said pressure control valve at a first maximum flow rate and a second flow control mode for supplying line pressure for said pressure control valve at a second limited flow rate which is smaller than said first maximum flow rate;

a sensor means for monitoring vehicular driving parameter affecting vehicular attitude for producing a sensor signal indicative thereof;

a power supply circuit for supplying an electric power to said fluid pressure source for driving the latter so as to enable supply of pressurized fluid to said fluid circuit;

a detector means for monitoring state of fluid flow for detecting line pressure to be supplied to said pressure control valve higher than said neutral pressure to produce a detector signal indicative thereof;

a control means responsive to said sensor signal for deriving a suspension control command for controlling said pressure control valve for adjusting pressure in said variable pressure chamber for regulating vehicular height and vehicular attitude, said control unit being powered by the electric power supplied by said power supply circuit, said control means being responsive to initiation of power supply for maintaining said flow control means at said second flow control mode until said line pressure at said pressure control valve being increased across said neutral pressure and maintaining said suspension control command value at a predetermined value for a predetermined period after placing said flow control valve network at a state permitting fluid flow thereacross.

7. An active suspension system as set forth in claim 6, wherein said control unit is also designed to maintain operation until the line pressure at said pressure control valve is adjusted substantially at said neutral pressure after shutting down of power supply from said power supply circuit.

8. An active suspension system as set forth in claim 7, wherein said control means sets said predetermined value to be initially set as said suspension control command value at a value substantially corresponding to said neutral pressure.

9. An active suspension system as set forth in claim 8, wherein said detector means monitors fluid pressure level of fluid flowing back to said pressurized fluid source for detecting fluid communication back to said pressurized fluid source from said pressure control valve by detecting fluid pressure lower than a predetermined level which is set slightly lower than said neutral pressure.

10. An active suspension system as set forth in claim 6, which further comprises a fail-safe valve in said fluid circuit, and a fail detecting means for monitoring operation to detect failure of the active suspension system for producing a fail indicative signal, said control unit normally operates said fail-safe valve to a first open position and responsive to said fail indicative signal for blocking fluid communication therethrough for forming closed circuit across said pressure control valve and said working chamber.

11. An active suspension system comprising:
a suspension system disposed between a vehicular body and a road wheel for damping energy for causing relative displacement between the vehicular body and the road wheel, said suspension system including means for defining a variable pressure chamber;

a fluid circuit, including a supply line for supplying pressurized fluid and a drain line for driving pressurized fluid, for circulating pressurized fluid through said supply line and said drain line across said variable pressure chamber, said fluid circuit including a pressurized fluid source and a pressure control valve means for adjusting fluid pressure within said variable pressure chamber across a predetermined neutral pressure;

a first flow control means disposed in said supply line between said pressurized fluid source and said pressure control valve means in said fluid circuit, said flow control means being operable between a first flow control mode for supplying line pressure for said pressure control valve at a first maximum flow rate and a second flow control mode for supplying line pressure for said pressure control valve at a second limited flow rate which is smaller than said first maximum flow rate;

a second flow control means disposed in said drain line between said pressure control valve and said pressurized fluid source, said second flow control means being responsive to the magnitude of line pressure supplied to said pressure control valve for switching position between a third flow control mode for permitting fluid flow thereacross for flowing back the working fluid drained from said pressure control valve to said pressurized fluid source while said line pressure supplied to said pressure control valve is maintained at least said neutral pressure, and a fourth flow control mode for blocking fluid flow therethrough while said line pressure supplied to said pressure control valve is maintained below said neutral pressure;

a sensor means for monitoring vehicular driving parameter affecting vehicular attitude for producing a sensor signal indicative thereof;

a power supply circuit for supplying an electric power to said fluid pressure source for driving the latter so as to enable supply of pressurized fluid to said fluid circuit;

a detector means for monitoring state of said second flow control means for detecting said second flow control means placed at said third flow control mode for producing a detector signal;

a control means responsive to said sensor signal for deriving a suspension control command for controlling said pressure control valve for adjusting pressure in said variable pressure chamber for regulating vehicular height and vehicular attitude, said control unit being powered by the electric power supplied by said power supply circuit, said control means being responsive to initiation of power supply for maintaining said flow control means at said second flow control mode until said detector signal is present and maintaining said suspension control command value at a predetermined value for a predetermined period after placing said flow control valve network at a state permitting fluid flow thereacross.

12. An active suspension system as set forth in claim 11, wherein said control unit is also designed to maintain operation until the line pressure at said pressure control valve is adjusted substantially at said neutral pressure after shutting down of power supply from said power supply circuit.

13. An active suspension system as set forth in claim 12, wherein said control means sets said predetermined value to be initially set as said suspension control command value at a value substantially corresponding to said neutral pressure.

14. An active suspension system as set forth in claim 13, wherein said detector means monitors fluid pressure level of fluid flowing back to said pressurized fluid source for detecting fluid communication back to said pressurized fluid source from said pressure control valve by detecting fluid pressure lower than a predetermined level which is set slightly lower than said neutral pressure.

15. An active suspension system as set forth in claim 11, which further comprises a fail-safe valve in said fluid circuit, and a fail detecting means for monitoring operation to detect failure of the active suspension system for producing a fail indicative signal, said control unit normally operates said fail-safe valve to a first open position and responsive to said fail indicative signal for blocking fluid communication therethrough for forming closed circuit across said pressure control valve and said working chamber.

* * * * *